US007185493B1

(12) United States Patent
Connelly

(10) Patent No.: US 7,185,493 B1
(45) Date of Patent: Mar. 6, 2007

(54) SOLAR ENERGY POWER PLANT AND METHOD OF PRODUCING ELECTRICITY

(76) Inventor: Bruce Connelly, 1711 W. Hall Ave., Slidell, LA (US) 70460

( * ) Notice: Subject to any disclaimer, the term of this patent is extended or adjusted under 35 U.S.C. 154(b) by 212 days.

(21) Appl. No.: 11/101,301

(22) Filed: Apr. 7, 2005

(51) Int. Cl.
*B60K 16/00* (2006.01)

(52) U.S. Cl. .................................. 60/641.15; 60/641.8

(58) Field of Classification Search ............... 60/641.8, 60/641.11, 641.15
See application file for complete search history.

(56) References Cited

U.S. PATENT DOCUMENTS

| | | | | |
|---|---|---|---|---|
| 3,309,012 A | * | 3/1967 | Booth et al. ................. | 417/379 |
| 4,027,480 A | * | 6/1977 | Rhodes ........................ | 60/531 |
| 4,312,927 A | * | 1/1982 | Salmon ........................ | 429/17 |
| 4,586,334 A | * | 5/1986 | Nilsson et al. ................ | 60/524 |
| 5,477,706 A | * | 12/1995 | Kirol et al. .................... | 62/480 |
| 6,080,927 A | * | 6/2000 | Johnson ....................... | 136/248 |

\* cited by examiner

*Primary Examiner*—Hoang Nguyen
(74) *Attorney, Agent, or Firm*—JoAnne M Denison; Denison & Assocs

(57) ABSTRACT

A power plant that uses a lens to focus solar energy onto a closed system loop is disclosed wherein a closed loop system is provided having a chamber that converts a liquid into a gas by absorbing heat. The heat being created has been generated by the focused solar energy. The gas drives a turbine engine, which, with the use of a generator, produces an electrical output. A heat exchange system also transfers heat energy to the chamber from the liquid storage tank and the capillary tube. The present invention may also communicate with traditional environmentally economic sources of power such as windmills and hydroelectric dams. Further, a method employing the same principals is disclosed.

10 Claims, 1 Drawing Sheet

SOLAR ENERGY POWER PLANT AND METHOD OF PRODUCING ELECTRICITY

FIELD OF THE INVENTION

The present invention relates to power plants that utilize solar energy in order to create electrical energy and more specifically, the disclosed invention relates to those power plants that focus the solar light through the use of a lens as well as situations wherein a power plant may continue to produce electrical energy when no source of solar light is present by means of a heat exchange and storage system.

BACKGROUND OF THE INVENTION

Energy concerns have long been the focus of many different groups. The world's attachment to fossil fuels has become a crutch. Additionally, fossil fuels exist in a limited amount and are thought to create serious environmental problems. The sun is an energy source that many scientists and inventors have thought of as a way to side step fossil fuels and their detrimental affects. However, very few people have been able to efficiently harness this energy source. Several patents have disclosed methods and structures for using solar energy to create electrical energy.

The Lawheed reference (U.S. Pat. No. 6,969,637) uses an array of Frensel Lenses to focus solar light onto a solar collecting cell. The solar collecting cell converts solar energy into electrical energy. The Doe reference (U.S. Pat. No. 6,062,029) also discloses an array of lenses used to heat a collecting line. This collecting line then powers a turbine engine.

The Sparkman reference (U.S. Pat. No. 5,775,107) and Watson reference (U.S. Pat. No. 4,284,063) are both systems that use solar energy to heat a liquid. In the Sparkman reference the liquid is a halogenated hydrocarbon. Further, the Watson reference discloses a liquid that is volatile.

The two Lindenbouer references (U.S. Pat. No. 4,566,434 and U.S. Pat. No. 4,335,707) disclose using a lens set into a block with a grove so the lens can rotate though the block to follow the path of the sun.

Further, the Dubicki reference (U.S. Pat. No. 4,343,295) discloses a lens that sits atop a tank that doubles as both a heating tank and a storage tank.

Additionally, references have disclosed using solar energy in conjunction with other methods of producing electrical energy. The Moore reference (U.S. Pat. No. 5,444,972) discloses a device that uses a hydrocarbon generator with a solar energy collection device. The Charlton reference (U.S. Pat. No. 6,434,942) uses solar collecting bricks and the Earth's gravitational force to create electrical energy.

The Alejandro reference (U.S. Pat. No. 5,206,537) discloses a power plant that uses wind power in addition to a pair of lenses used to focus the suns light on a pipe. Another power plant, disclosed in the Derby reference (U.S. Pat. No. 4,232,523), discloses a reflective device to collect energy from solar light.

The device in the Lane reference (U.S. Pat. No. 4,213,303) discloses a device that uses a lens to heat a liquid. However, the device has a separate chamber for condensation.

The Be II reference (U.S. Pat. No. 4,206,608) discloses a method and apparatus for producing electricity and pressurizing hydraulic fluid. The Dimitroff reference (U.S. Pat. No. 4,068,474) discloses a device that uses a concave collecting chamber and concave directing lens.

The Houston reference (U.S. Pat. No. 4,066,062) discloses a device that uses a plurality of lens to focus the sun's light. Additionally, the Arthur reference (U.S. Pat. No. 4,010,614) discloses the use of a plurality of parabolic surfaces to direct the sun's light.

The Bard reference (U.S. Pat. No. 3,985,118) discloses the use of a plurality of Frensel lens on a pyramid mounting structure, which sits atop of a liquid collecting device. The Dix reference (U.S. Pat. No. 3,965,683) discloses using a lens to heat an expandable fluid.

The Hanold, et al reference (U.S. Pat. No. 3,029,596) discloses a device that uses a satellite power plant to operate a Stirling cycle engine. Further, the Metzech, et al reference (U.S. Pat. No. 1,658,455) uses a row of lenses to heat a rudimentary boiler.

None of these references utilize the novel elements disclosed in the present invention. More specifically, none of these references disclose a rounded state change chamber, capillary tube and heat exchange system. These novel elements separate the present invention from the prior art.

While, all of these references disclose devices that advance the science of solar energy, none of the devices has efficiently been able to provide inexpensive, consistent, and cost effective electrical energy from solar energy. There remains to be a long felt need for a solar energy power plant that can efficiently provide electrical energy that is inexpensive, cost efficient, and continuous.

BRIEF SUMMARY OF THE INVENTION

The present invention improves on numerous dimensions of the earlier devices, allowing for a completely self-sustaining power plant. This power plant and method disclosed herein convert solar energy into electrical energy through thermal conduction. This novel approach at utilizing solar energy can provide for continual, inexpensive, and cost efficient electrical energy, without the detrimental aspects of a fossil fuel or nuclear power plant.

A large lens is mounted on a support above a rounded state change chamber. The lens should focus and concentrate the solar light. The support allows the lens to move along a path that parallels the path of the sun across the sky. The lens should remain at a point along the path that is relatively perpendicular to the sun.

It is preferred that the lens be at least 5 (five) feet in diameter, but it is understood that lens of different sizes could be used and still be within the scope of this invention. Further, it is preferred that the lens be capable of producing between 3,500° F. and 9,000° F. at the focal point of the lens. Once again, it is to be understood that lenses which produce a temperature outside of the preferred range will still be within the scope of the present invention.

Additionally, the support must also adjust as the sun takes different paths across the sky, depending on the seasons. The focal point of the lens is the rounded state change chamber.

As the focused and concentrated light hits the surface of the rounded state change chamber, the surface of the rounded state change chamber will heat up. The rounded state change chamber is part of a closed system loop. The loop contains a substance in both the liquid state and the gas state. Water could be used because water has a relatively high specific heat and little, if any, detrimental environmental aspects.

The rounded state change chamber allows the liquid to evaporate into the gas state by absorbing the heat of the rounded state change chamber. The gas vapor powers a turbine engine, which creates electrical energy. The rounded state change chamber may be composed of a combination of ceramics and high temperature polymers.

An additional source of energy is the heat exchange system that transfers heat from a storage tank to the rounded state change chamber. This allows the power plant to continually produce electricity even when the sun no longer provides solar light, for example, at night or when clouds shield the sun. Further, the heat exchange system could function between the capillary tube and the rounded state change chamber. This would allow for even more heat to be transferred to the rounded state change chamber.

The heat exchange system functions substantially similar to a industrial refrigeration system. These systems contain a compressor and evaporator coils and condenser heat exchange coils. These systems are known by one of ordinary skill in the art.

The additional components to the present invention would be readily ascertainable to one of ordinary skill in the art. For example, solar panels and windmills, are available and known by those in the art. In the preferred embodiment, the windmill should be rated at least at 600 Kw, but it is to be understood that the invention may employ a windmill with a lower rating and still be within the scope of the invention.

Further the turbines, which are driven by the gaseous vapor, would preferably be higher output steam generators, such as those commercially available from Siemens-WestingHouse. Once again, different turbines may be used and still be within the scope of this invention.

These and other components of the present invention will be discussed in great detail below in the detailed description of the present invention. Most, if not all, of these components are known in the art by one of ordinary skill and are available commercially.

OBJECTS OF THE PRESENT INVENTION

It is therefore a primary object of the present invention to create a power plant and a method that rely mostly on solar energy, allowing for an easier, less expensive, more efficient and continuous source of electricity by providing a plant and a method that use a lens and a rounded state change chamber in conjunction with a heat transfer system to continuously create an electric current.

Another primary object in the present invention is the use of a rounded state change chamber and a lens that is movable mounted to keep the focal point of the lens on the rounded state change chamber to increase the efficiency of the power plant by allowing the most amount of focused and concentrated sun light to continuously heat the rounded state change chamber.

A further primary object of the present invention is to combine the direct solar energy production with a heat exchange system to allow for the liquid to evaporate into gas, even without the heat from the focused and concentrated solar light, producing electricity without solar light present.

Still another primary object of the present invention is its ability to completely function without using any fossil fuels, or other polluting energy sources by combining the disclosed invention with other conventional environmentally safe energy producing structures, such as: windmills, solar power panels, and hydro-electric dams.

An additional primary object of the present invention is to provide a power source that is safer than other power plants currently being used, by disclosing an invention that operates using water, an environmentally safe substance, water vapor and a steam turbine, all of which when combined as disclosed produce electricity and no environmental side affects.

Yet an additional primary object of the present invention is to improve on the short-comings of the earlier art and to advance the art by: disclosing a closed loop system that minimizes heat loss, and utilizes lost heat to produce electricity, making the invention more efficient; disclosing an invention that combines various environmentally safe energy producing structures, making the invention better for the environment; disclosing an invention that uses a heat exchange system, allowing the invention to continually produce power.

These and other objects and advantages of the present invention can be readily derived from the following detailed description of the invention taken in conjunction with the accompanying drawings present herein and should be considered as within the overall scope of the invention.

BRIEF DESCRIPTIONS OF THE DRAWINGS

DETAILED DESCRIPTION

Figure 1:
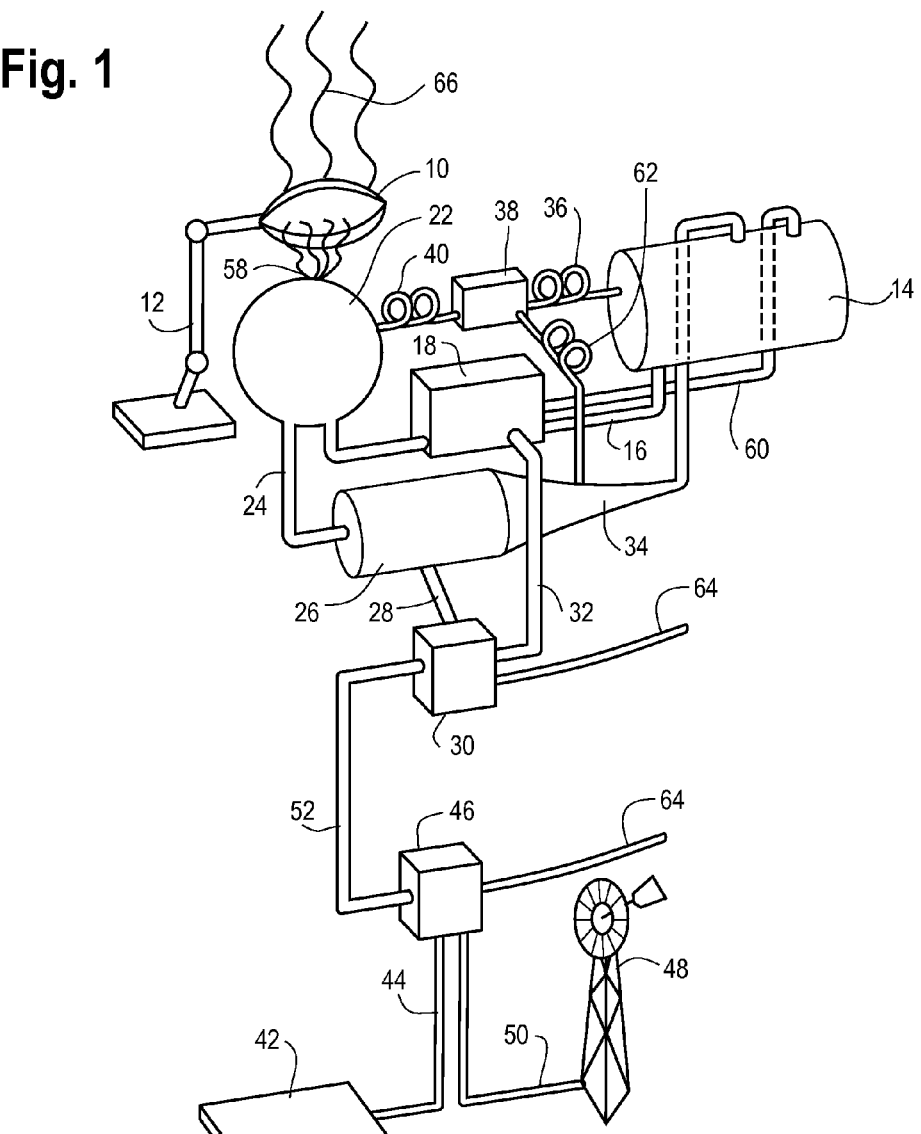
FIG. 1 is a perspective view of the present invention.

With reference to the drawings, specifically FIG. 1, a solar energy plant 11 will be described. The solar energy plant 11 utilizes the advancements previously mentioned.

The solar energy plant 11 is provided with a lens 10 mounted on a support 12. The lens 10 can be made of plastic or glass. In one preferred embodiment, preferred lens 10 would be substantially 5 (five) feet in diameter, but a wide variety of alternate sized lenses would be acceptable. The lens 10 must focus light 66 from the sun 54 to a focal point 58. The distance between the focal point 58 and the lens 10 will depend on the size of the lens 10 and the type of lens 10. The lens 10 could be a convex lens, double convex lens, magnifying lens, or any other form of lens 10 structure and still be covered by the scope of this invention. As previously mentioned, the lens 10 could be a magnifying lens and thus magnify the light 66, to increase the intensity of the light 66 on the focal point 58.

Figure 2:
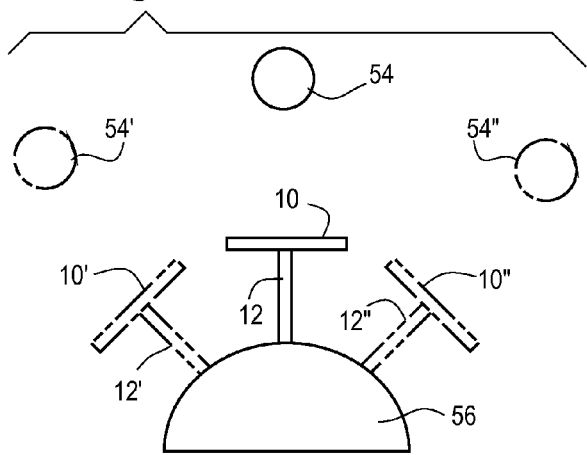
FIG. 2 is an elevational side view of the rounded state change chamber and lens on the support.
Figure 3:
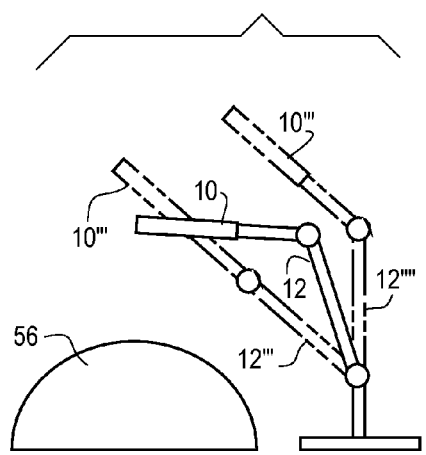
FIG. 3 is another elevational side view of the rounded state chamber and lens on the support.

The support 12 holds the lens 10 between the sun 54 and the rounded state change chamber 22. The shape, size, and structure of the support 12 will depend on the size and type of the lens 10. The focal point 58 of the lens 10 is concentrated on the surface of the rounded state change chamber 22. The support 12 must be able to move 12', 12" to position the lens 10', 10" at a point that is relatively perpendicular to the sun 54', 54", as the sun 54', 54" moves along its path. See FIG. 2. Additionally, the support must be able to move 12''', 12'''' to adjust the lens 10''', 10'''' as the sun's path is effected by the change of seasons. See FIG. 3.

Further, a sun-tracking device would preferably be employed to automatically determine the position of the sun and position the support accordingly. Sun-tracking devices usually have an optical sensor, which determines the position of the sun, and a series of rotating and directional motors, which position the support at the necessary position to place the lens at the desired position, which in the present invention is approximately perpendicular to the light being emitted from the sun. Automatic sun-tracking devices are generally known to those skilled in the art.

The rounded state change 22 chamber extends above the surface on which the plant is constructed. The rounded state change chamber 22 may be substantially spherically shaped, or it can be semicircular 56. While it is preferred that the rounded state change chamber 22 be substantially spherically shaped, it could also be a number of other shapes, such as elliptical shaped or egg shaped and still be within the overall scope of the present invention. However, the rounded state change chamber 22 must be substantially rounded so that the focal point 58 moves uninterrupted across the surface of the rounded state change chamber 22, allowing for the heat transfer from the light 66 to the rounded state change chamber 22 to the liquid to be as efficient as possible. The preferred embodiment of the rounded state change chamber 22 would be composed of ceramic or a ceramic composite. The rounded state change chamber 22 may also be composed of metal or a metal-alloy, or any other suitably conductive material. The rounded state of change chamber 22 should be thinner where the focal point 58 hits the surface, allowing for most of the heat to be transferred into the liquid contained therein, instead of dissipating into the environment. The portions of the rounded state of change chamber 22 that do not contact the focal point 58, could be insulated to further minimize heat loss.

For example, a substantially spherically shaped state of change chamber has a thin ceramic shell. The bottom half of the chamber is placed inside of a slightly larger half circular shaped insulator. Thus, the top portion of the chamber where the focal point contacts would be exposed and thin to allow for maximum heat transfer and minimum loss, while the bottom of the chamber would be insulated to provide maximum heat retention and minimum loss.

A liquid that is stored in an insulated storage tank 14 moves through a first conduit 16 into a pump 18. The insulated storage tank 14 is preferably about 1 million gallons, but sizes may vary accordingly to fit electrical demand as well as physical space constraints. The conduits 16, 20, 60, 24 throughout the detailed description may be any structure that can transfer gas and liquid, for example a pipe. Additionally, the conduits 16, 20, 60, 24 may be insulated to minimize heat loss. The pump 18 may be any number of pumps, including, but not limited to simple mechanical pumps or a gravitational pump. The pump 18 must facilitate the movement of the liquid throughout the system.

The pump 18 moves the liquid through a second conduit 20 into the rounded state change chamber 22. When additional heat is needed in the cycle when the lens 10 cannot focus the light 66, the pump 18 may return the liquid to the insulated storage tank 14 through another conduit 60 where the liquid may absorb heat from the insulated storage tank 14. This may occur when the lens 10 cannot focus the light 66 and the system utilizes the heat exchange coil 36 and heat exchange compressor 38 to heat the rounded state change chamber 22 and allow the system to produce a sufficient electrical output through electrical output wires 64.

Inside the rounded state change chamber 22, the liquid is heated to gaseous form and pushed through a third conduit 24 to a turbine 26. A person skilled in the art would realize that other types of engines could be used in lieu of the turbine 26. As the gas passes through the turbine 26, it may drive the turbine 26. The turbine 26 may be connected physically and through wires 28, to a generator 30. The generator 30 may produce the electrical output that can be sent to: the electrical components of the power plant (pump, sun-tracking device, or computer controls), through wires 32; a battery or other electrical storage structure 46, through wires 52; or users as electrical energy output through power lines 62. Additionally, the current can be sent to transformers as the power plant's electrical output through electrical output wires 64.

The gas coming out of the steam turbine 26 may enter a capillary tube 34, which may force the gas to condense back into liquid form, but also may allow the substance to retain as much heat as possible. The capillary tube 34 may be insulated to allow the liquid and gas to retain heat. The capillary tube 34 may be constructed of a material that does not absorb heat very well and then minimally insulated. Conversely, the capillary tube 14 may be constructed of a relatively thin layer of material that absorbs heat and heavily insulated to allow the capillary tube 14 to retain high amounts of heat energy. The capillary tube 34 returns the liquid to the storage tank 14, therein the storage tank 14 can absorb the heat from the heated liquid.

Heat exchange coils 36, 40 and a heat exchange compressor 38 transfer the heat from the insulated storage tank 14 to the rounded state change chamber 22. This allows liquid to be pumped into the rounded state change chamber 22 and absorb enough heat to evaporate into the gaseous state without the sun light 60 being present. A heat exchange coil 62 may also be connected to the capillary tube 14, allowing heat to transfer from the capillary tube 34, through the heat exchange coil 62, to a heat exchange compressor 38. A further heat exchange coil, not shown, can be located inside of the insulated storage tank. This would transfer additional heat from the liquid to be used in the system when the lens heat is not available. This system generally is a heat exchange system. This information is generally known, and currently is used in a variety of known and practiced methods and means, such as: air conditioners and refrigerators.

Additionally, a solar panel 42 can collect light 66 and transmit the electrical energy through wires 44 to the battery or other electrical storage structure 46. A windmill 48 can also be connected by wires 50 to the battery or other electrical storage structure 46. There the electricity can be used to power the components of the power plant that require electricity, such as the pump 18 or the support 12.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. An apparatus for producing an electrical output, the apparatus comprising:
   (a) a lens, the lens having a focal point, the lens being mounted on a movable support;
   (b) a closed system loop, the closed system loop having:
      a storage tank;
      a pump, the pump communicating with the storage tank;
      a rounded state change chamber, the rounded state change chamber being located at the focal point, the rounded state change chamber communicating with the pump;
      a turbine, the turbine communicating with the rounded state change chamber, the turbine communicating with a generator, the generator producing the electrical output; and a capillary tube, the capillary tube communicating with the turbine, the capillary tube communicating with the storage tank; and (c) a heat exchange system, the heat exchange system communicating between the storage tank and the rounded state change chamber.

2. The apparatus of claim 1, wherein the storage tank holds a substance, the substance being water.

3. The apparatus of claim 1 further comprising a solar panel and a wind mill and a battery, the solar panel communicating with the battery, the wind mill communicating with the battery, the generator communicating with the battery, the battery storing and distributing the electrical output.

4. The apparatus of claim 1 further comprising a sun-tracking device, the sun tracking device communicating with the movable support.

5. An apparatus for producing an electrical output, the apparatus comprising:
   (a) a lens, the lens having a focal point, the lens being mounted on a movable support;
   (b) a closed system loop, the closed system loop having:
      a storage tank;
      a pump, the pump communicating with the storage tank;
      a rounded state change chamber, the rounded state change chamber being located at the focal point, the rounded state change chamber communicating with the pump;
      a turbine, the turbine communicating with the rounded state change chamber, the turbine communicating with a generator, the generator producing the electrical output; and
      a capillary tube, the capillary tube communicating with the turbine, the capillary tube communicating with the storage tank; and
   (c) a heat exchange system, the heat exchange system communicating between the storage tank and the rounded state change chamber, the heat exchange system communicating between the capillary tube and the rounded state change chamber.

6. The apparatus of claim 5, wherein the storage tank holds a substance, the substance being water.

7. The apparatus of claim 5 further comprising a solar panel and a wind mill and a battery, the solar panel communicating with the battery, the wind mill communicating with the battery, the generator communicating with the battery, the battery storing and distributing the electrical output.

8. The apparatus of claim 5 further comprising a sun-tracking device, the sun tracking device communicating with the movable support.

9. A method for producing an electrical output, the method consisting of the steps:
   a. providing a state change chamber, a light source, a substance, a storage tank, a generator, a turbine and a capillary tube, and focusing the light onto the rounded state change chamber;
   b. absorbing heat from the light into the rounded state change chamber;
   c. pumping a substance into the rounded state change chamber from the storage tank; d. evaporating the substance into a gaseous form in the rounded state change chamber by absorbing the heat;
   e. driving the turbine with the gaseous form;
   f. condensing the gaseous form into a liquid form;
   g. transferring a heat energy from the liquid form and gaseous form to the storage tank;
   h. transferring the heat energy from the storage tank to the rounded state change chamber through a heat exchange system;
   i. channeling the liquid form and gaseous form to the storage tank through a capillary tube; and,
   k. producing the electrical output from the generator, the generator communicating with the turbine.

10. The method of claim 9 further comprising the steps of:
   transferring a second heat energy from the liquid form and the gaseous form to the capillary tube; and,
   transferring the second heat energy from the capillary tube to the rounded state change chamber through the heat exchange system.

* * * * *